US007694033B2

(12) United States Patent
Ohbitsu

(10) Patent No.: US 7,694,033 B2
(45) Date of Patent: Apr. 6, 2010

(54) INFORMATION PROCESSING APPARATUS MANAGING A PERIPHERAL DEVICE CONNECTED TO A COMPUTER

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 11/238,996

(22) Filed: Sep. 30, 2005

(65) Prior Publication Data

US 2006/0224782 A1 Oct. 5, 2006

(30) Foreign Application Priority Data

Mar. 31, 2005 (JP) ............... 2005-102450

(51) Int. Cl.
*G06F 3/00* (2006.01)
*G06F 13/00* (2006.01)
(52) U.S. Cl. ............... 710/16; 710/8; 710/17; 719/321; 719/327
(58) Field of Classification Search .............. 710/1, 710/8–19; 719/321–327
See application file for complete search history.

(56) References Cited

U.S. PATENT DOCUMENTS

| 5,794,032 | A | 8/1998 | Leyda |
| 6,345,319 | B2 | 2/2002 | Lin et al. |
| 6,606,669 | B1 * | 8/2003 | Nakagiri ............... 719/327 |
| 2002/0052982 | A1 | 5/2002 | Kubota ............... 709/321 |
| 2002/0073411 | A1 | 6/2002 | Tsunedomi et al. |
| 2004/0043496 | A1 | 3/2004 | Superko |
| 2004/0123305 | A1 | 6/2004 | Kim et al. |
| 2004/0181593 | A1 | 9/2004 | Kanojia et al. |

FOREIGN PATENT DOCUMENTS

| JP | 11-296325 | 10/1999 |
| JP | 2002-182919 | 6/2002 |
| JP | 2002-323977 | 11/2002 |
| KR | 1998-027995 | 7/1998 |

(Continued)

OTHER PUBLICATIONS

German Office Action dated Jan. 23, 2006 in German Patent Application No. 102005034020.2.

(Continued)

*Primary Examiner*—Alford W Kindred
*Assistant Examiner*—Richard Franklin

(57) ABSTRACT

According to the present invention, is allowed to store, in a hard disk drive, only a driver and an application which are necessary for a peripheral device connected a personal computer, the area in use of the hard disk drive is reduced. An information processing apparatus comprising first storing unit storing therein a basic program which is executed on a computer connectable to a peripheral devices, peripheral device associated programs which is executed when the peripheral devices is in use, and an identification program for identifying a type of the peripheral device connected to the computer and control unit executing the basic program, the peripheral device associated programs, and the identification program, wherein the control unit includes unit storing the type of the currently connected peripheral device through the execution of the identification program and unit storing, from second storing unit storing therein the plurality of peripheral device associated programs, the peripheral device associated programs which is associated with the currently connected peripheral device in the first storing unit through the execution of the basic program.

6 Claims, 11 Drawing Sheets

FOREIGN PATENT DOCUMENTS

| KR | 11-296325 | 10/1999 |
| KR | 2002-0013425 | 2/2002 |
| KR | 10-2004-0053496 | 6/2004 |

OTHER PUBLICATIONS

Notification of Argument Submission from Korean Patent Office in, corresponding Korean Patent Application No. 10-2005-0072787, dated Nov. 21, 2006.

Notification of Argument Submission from Korean Patent Office in corresponding Korean Patent Application No. 10-2005-0072787, dated Sep. 21, 2006.

Notice of Allowance for Patent, mailed Jul. 10, 2007 in corresponding Korean Patent Application No. 10-2005-0072787 (2 pages).

* cited by examiner

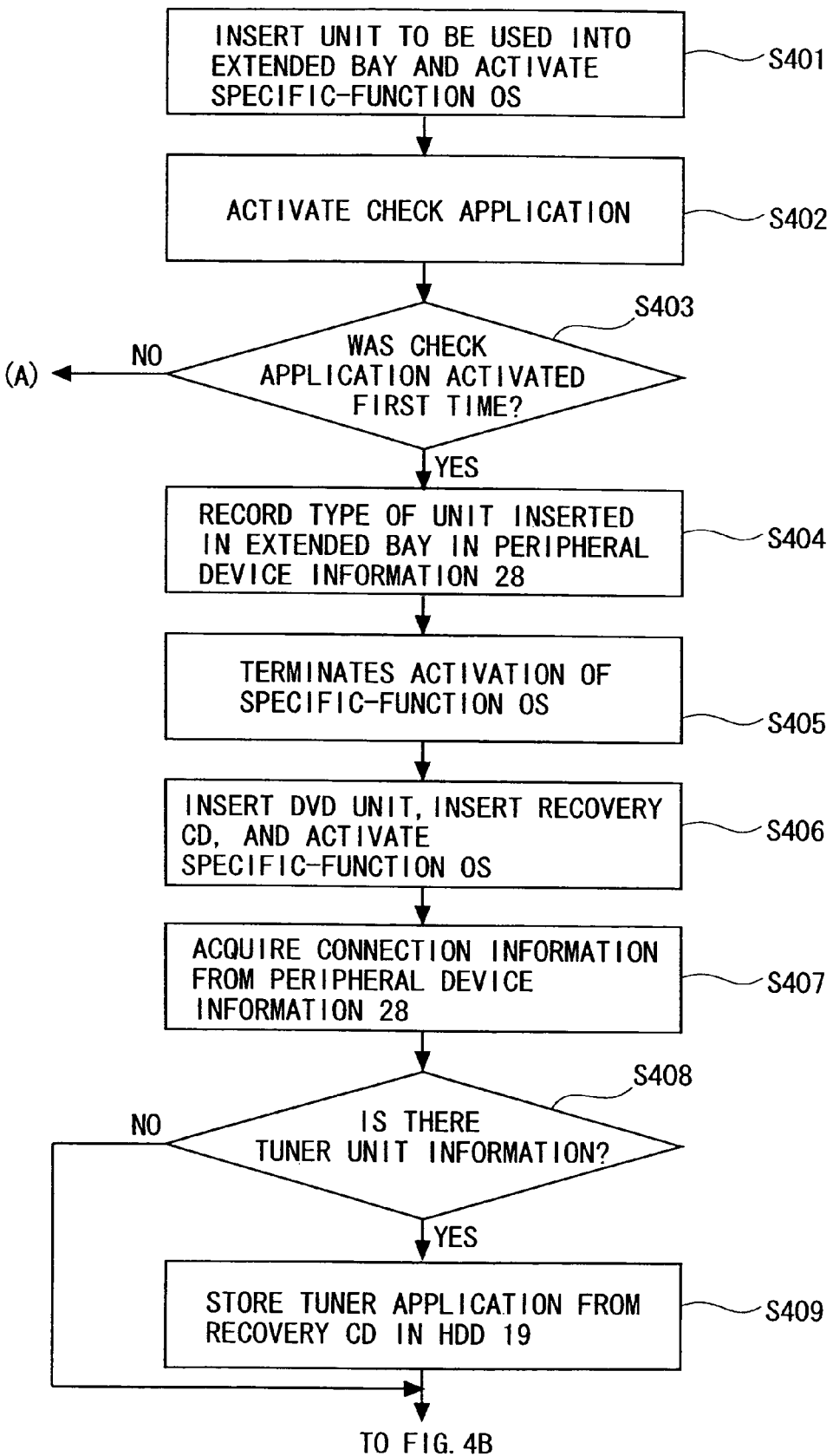

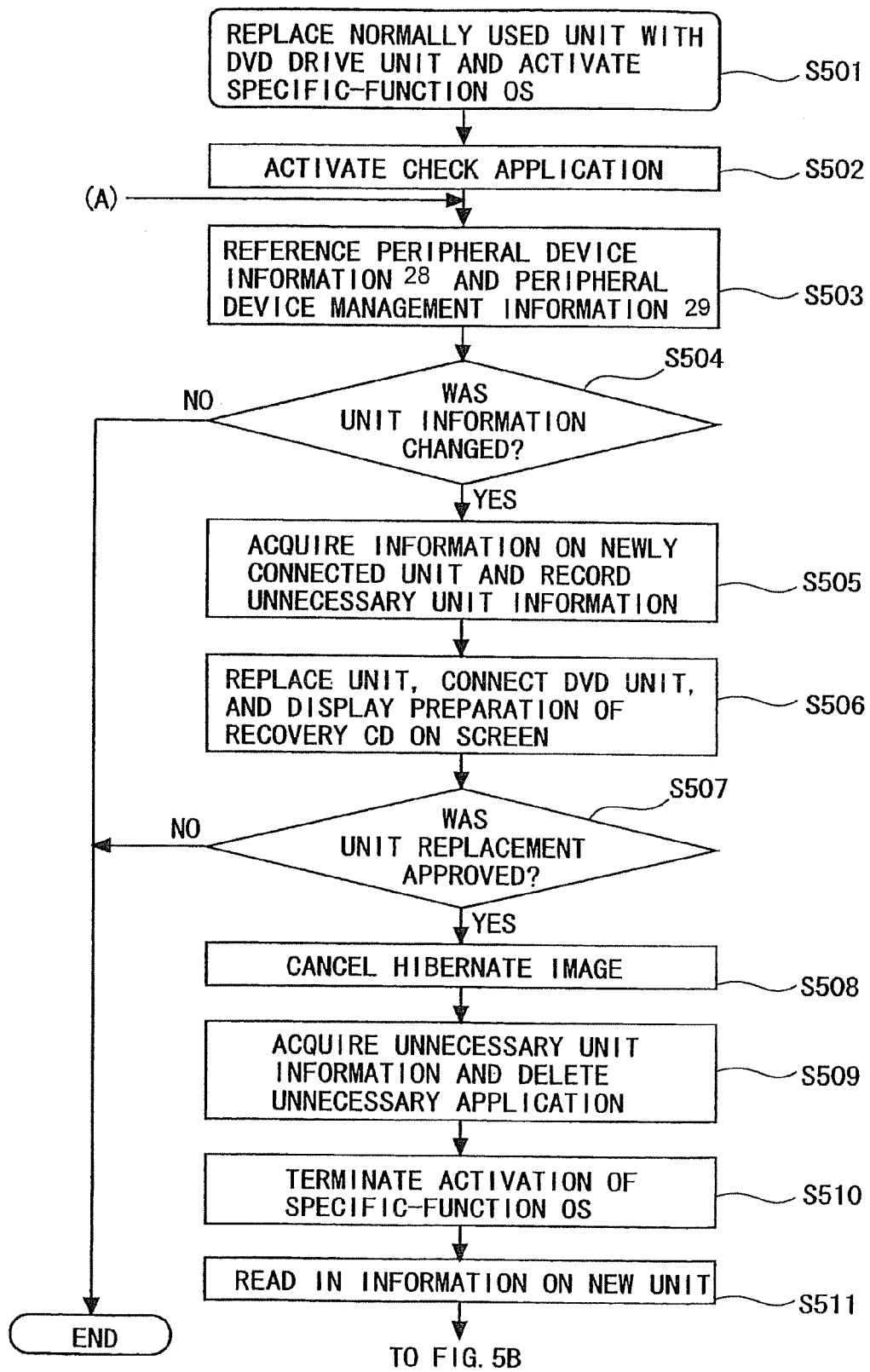

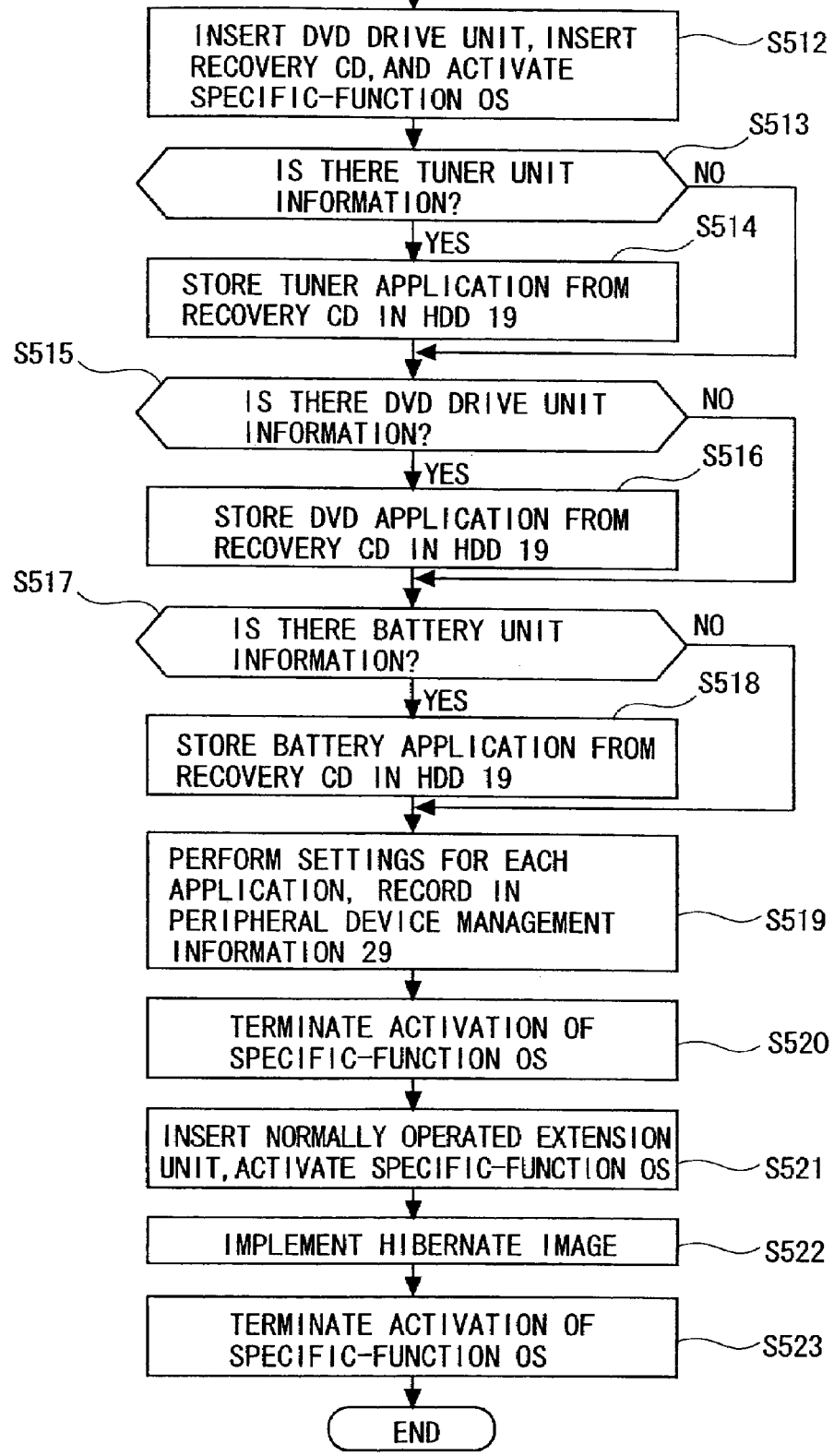

FIG. 9

INSERT DVD DRIVE UNIT INTO EXTENDED BAY

INFORMATION PROCESSING APPARATUS MANAGING A PERIPHERAL DEVICE CONNECTED TO A COMPUTER

BACKGROUND OF THE INVENTION

The present invention relates to an information processing apparatus.

In recent years, there has been an OS (Operating System) to be installed in a personal computer (PC) which has the function thereof limited to perform only a specific function. However, a area dedicated to the OS is not prepared in a storage device such as HDD (Hard Disk Drive). OSes which are shipped in the state in which they have been installed in personal computers include a general-purpose OS and a specific-function OS. The specific-function OS has been installed in combination with the general-purpose OS in one storage device. The specific-function OS cannot be recognized from the general-purpose OS. Therefore, from the viewpoint of the general-purpose OS, the specific-function OS is an unusable area. Accordingly, it is necessary to minimize the area of the specific-function OS.

Even when a variety of control devices (which are also termed peripheral devices) and applications for operating the control devices are connected exclusively to the specific-function OS, the area of the OS with a specific function should be calculated by considering all the control devices and the applications for operating the control devices. There has been a technology which installs, in a controller to which control devices are connectable, applications corresponding to the connected control devices (see, e.g., Patent document 1).

[Patent document 1] JP 2002-182919 A

[Patent document 2] JP 2002-323977 A

The technology mentioned above recognizes the control devices by using a controller. Therefore, even though any of the control devices is not actually used, the application therefor is stored (also termed installed) because the controller detects the control device. Once the application has been installed, even when the connected control device can easily be detached, the application therefor that has become unnecessary cannot be deleted (also termed uninstalled).

It follows that, even when the capacity of the storage device in which the operation systems are installed is limited, the unnecessary application is present therein. As a result, there are cases where, even when a control device is added and an operation for installing an application therefor is newly performed, the application cannot be installed because of the limited capacity of the storage device. In addition, a delay occurs in the activation time for the OS due to the unnecessary application.

SUMMARY OF THE INVENTION

It is therefore an object of The present invention to allow an information processing apparatus to store, in a storage device, only an application which is necessary for a peripheral device connected to the personal computer and thereby reduce the area in use of the storage device. The present invention also allows, upon the activation of a specific-function OS, a comparison with a pre-activation state and automatic deletion of an application that has become unnecessary. As a result, the unnecessary application is deleted from the storage device so that, even when an application is newly stored therein, the capacity of the storage device can be prevented from being overrun.

To solve the problems, The present invention has adopted the following means. (1) According to the present invention, An information processing apparatus comprising a first storing unit storing therein a basic program which is executed on a computer connectable to a peripheral devices, peripheral device associated programs which is executed when the peripheral devices is in use, and an identification program identifying a type of the peripheral device connected to the computer and a control unit executing the basic program, the peripheral device associated programs, and the identification program, wherein the control unit includes a unit storing the type of the currently connected peripheral device through the execution of the identification program and a unit storing, from a second storing unit storing therein the plurality of peripheral device associated programs, the peripheral device associated programs which is associated with the currently connected peripheral device in the first storing unit through the execution of the basic program. The arrangement allows the information processing apparatus to install in a storage device only an application which is necessary for the peripheral device connected to the personal computer and thereby reduce the area in use of the storage device.

(2) Alternatively, The present invention may include means for deleting, from the first storing means, any of the peripheral device associated programs that is not associated with the currently connected peripheral device through the execution of the basic program. The arrangement allows, upon the activation of a specific-function OS, a comparison with a pre-activation state and automatic deletion of the application that has become unnecessary. As a result, the unnecessary application is deleted from the storage device so that, even when an application is newly stored therein, it becomes possible to prevent the capacity of the storage device from being overrun.

(3) According to The present invention, the peripheral device may also be an extension unit which is connected exclusively to an extended slot of a computer.

The present invention allows the information processing apparatus to store only an application which is necessary for the peripheral device connected thereto in the storage device and thereby reduce the area in use of the storage device. In addition, The present invention allows, upon the activation of the specific-function OS, a comparison with the pre-activation state and automatic deletion of the application that has become unnecessary. As a result, the unnecessary application is deleted from the storage device so that, even when an application is newly stored therein, it becomes possible to prevent the capacity of the storage device from being overrun.

BRIEF DESCRIPTION OF THE DRAWINGS

FIG. 4A is a flow chart showing a process (new storing process) when an extension unit is first connected to the information processing apparatus.

FIG. 5A is a flow chart showing a process (unit replacing process) when a normally used extension unit is replaced.

FIG. 5B is a flow chart showing a process (unit replacing process) when a normally used extension unit is replaced.

FIG. 9 is an example of screen display of an instruction to insert the DVD drive unit 7 into the extended bay 5.

DETAILED DESCRIPTION OF THE INVENTION

Figure 1:
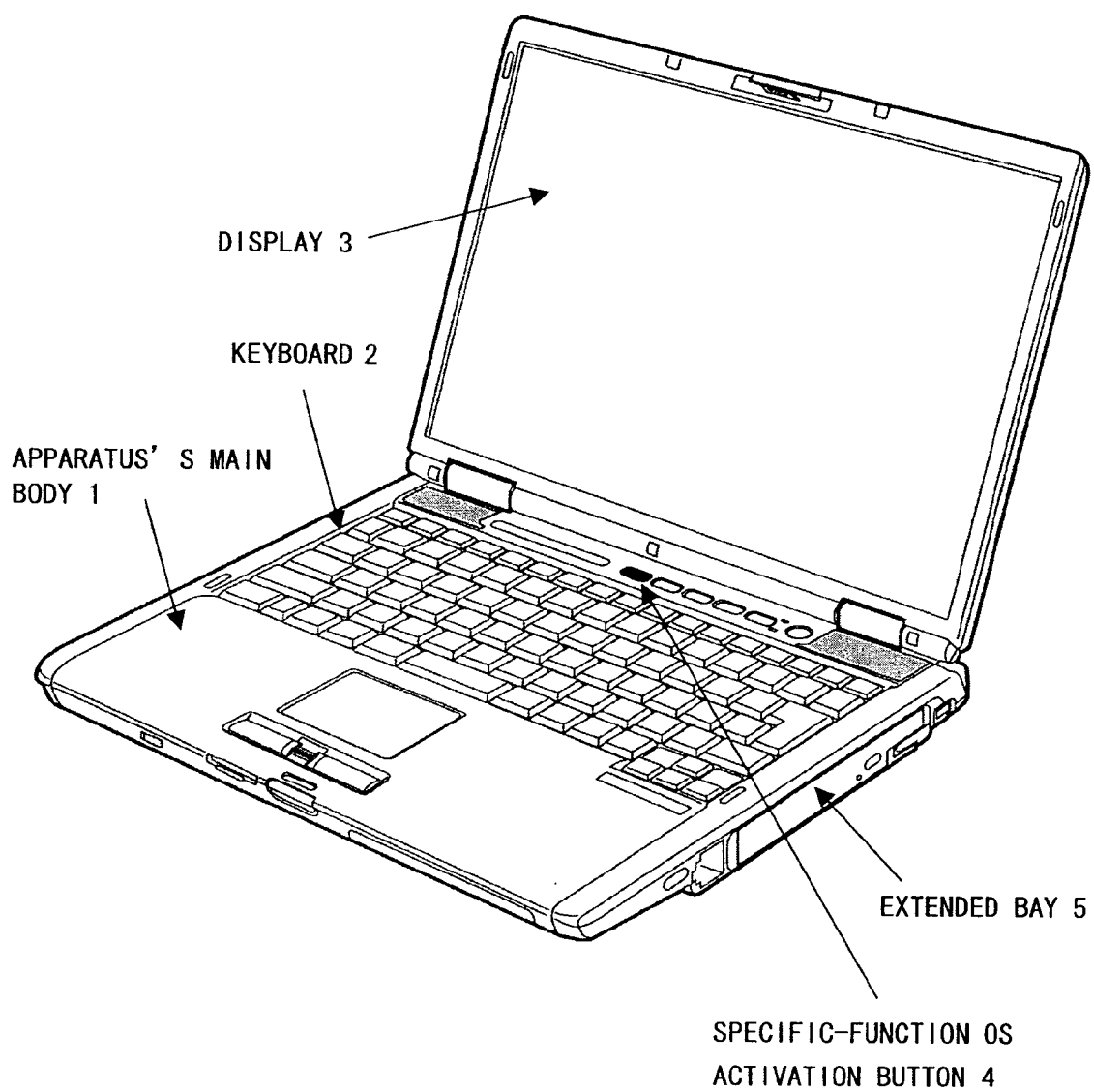
FIG. 1 is an outward appearance view of an information processing apparatus according to the best mode of The present invention.

Referring now to the drawings, a description will be given herein below to an information processing apparatus according to a best mode (hereinafter referred to as an embodiment) for carrying out The present invention. The constitution of the following embodiment is only illustrative and The present invention is not limited to the constitution of the embodiment.

<Outward Appearance of the Apparatus>

The information processing apparatus can be implemented as an information device such as a personal computer, a mobile information terminal, or a mobile phone. In the following, an example will be shown which implements the information processing apparatus as a personal computer.

FIG. 1 shows an outward appearance view of the information processing apparatus. The information processing apparatus has an apparatus's main body 1, a keyboard 2 operated in association with the apparatus's main body 1, and a mouse not shown. The apparatus's main body 1 has a display 3, a screen cabinet surrounding the display 3, and a specific-function OS activation button (one-touch button) 4 provided under and at the center of the entire surface of the screen cabinet including the display 3.

The apparatus's main body 1 has an extended bay 5. In the extended bay 5, there are inserted various extension units including a tuner unit (receiving device) 6, a DVD drive unit 7, and a battery unit 8. The DVD drive unit 7, which is used to read information recorded on a DVD medium therefrom and write information thereon, is used to read information recorded on not only the DVD medium but also a CD or another recording medium therefrom and write information thereon.

The embodiment of The present invention is not limited to such an information processing apparatus in which the tuner unit 6, the DVD drive unit 7, and the battery unit 8 are inserted. The present invention is also applicable to an information processing apparatus in which another drive unit, e.g., a CD-ROM drive unit, a hard disk drive unit, or a magneto-optical disk drive unit is inserted. A peripheral device other than an extension unit may also be an application target. In the apparatus's main body 1, there are embedded a CPU which provides the function of the information processing apparatus, memories (including a RAM and a ROM), a hard disk, and various controllers.

Figure 2:
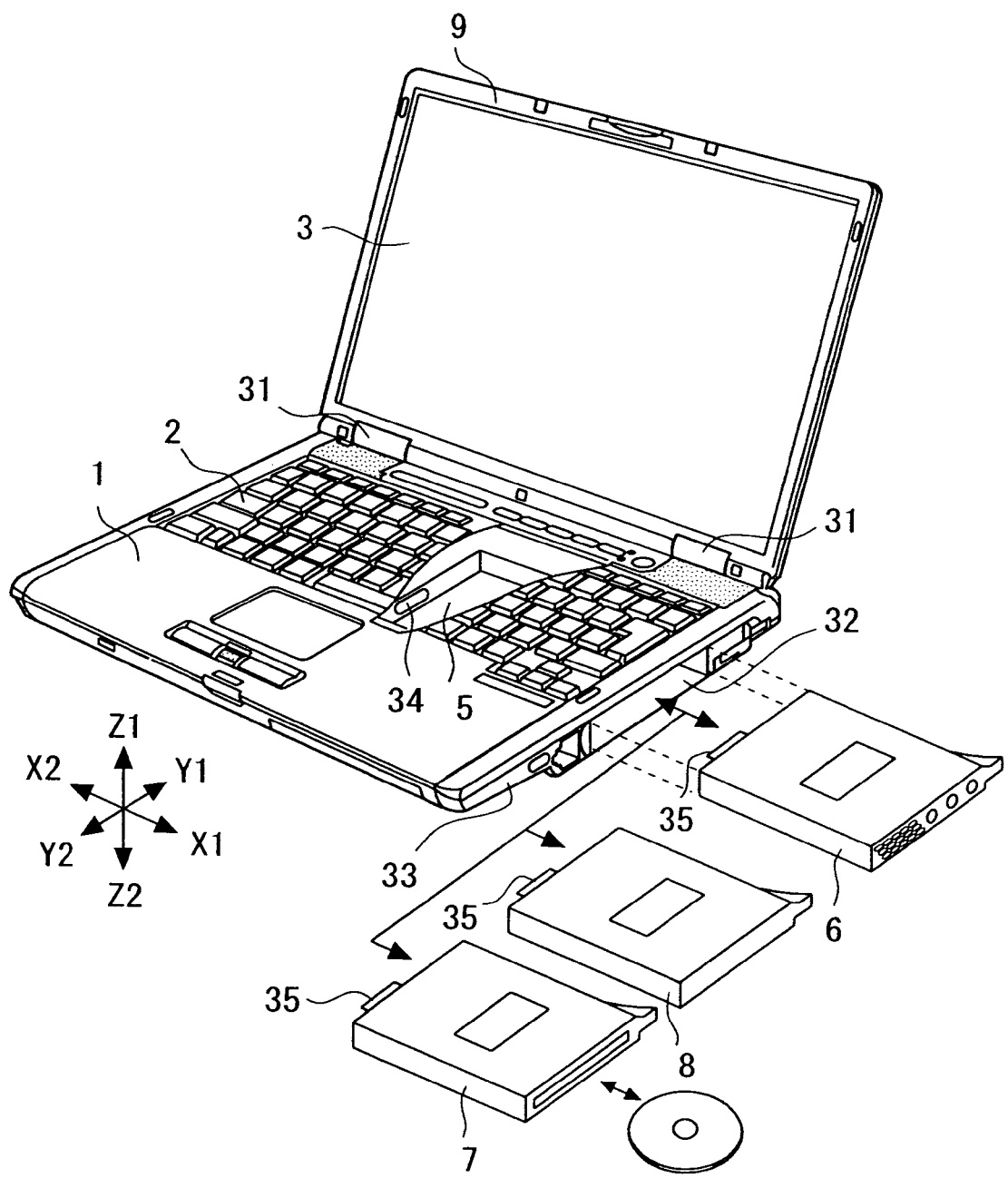
FIG. 2 is a schematic diagram of the information processing apparatus according to the best mode of The present invention.

FIG. 2 is a schematic diagram of the embodiment of The present invention. The embodiment shows an example of a personal computer (corresponding to an electronic device) 9 which allows the insertion of an extension unit into the extended bay 5. In FIG. 2, the personal computer 9 is constituted by the apparatus's main body 1 and the display 3 coupled to the apparatus's main body 1 to be openable and closable by means of a hinge 31. Each of the arrows X1 and X2 indicates the widthwise direction of the personal computer 9, while each of the arrows Y1 and Y2 indicates the depthwise direction thereof and each of the arrows Z1 and Z2 indicates the heightwise (thicknesswise) direction thereof.

The apparatus's main body 1 has the keyboard 2 on the upper surface thereof, has the CPU and the like in the inside thereof, and has the extended bay 5 for containing an extension unit formed in the lower right portion thereof. The extended bay 5 has an opening 32 as an insertion slot for the extension unit in a right side surface 33 of the apparatus's main body 1. The extended bay 5 is configured as a slit extending from the opening 32 in the direction indicated by the arrow X2 halfway across the apparatus. The end portion of the extended bay 5 in the direction indicated by the arrow X2 is provided with a connector 34. Since the connector 34 is located in the inside of the apparatus's main body 1, it is shown in FIG. 2 by partly cutting away the upper surface of the apparatus's main body 1.

As the extension units, the tuner unit 6, the DVD drive unit 7, the battery unit 8, and the like are prepared. Each of the extension units 6, 7, and 8 is configured as a flat plate which is insertable into the extended bay 5 and has a connector 35 which is connectable to the connector 34 at the tip portion thereof in the direction (X2) of insertion. Each of the units 6, 7, and 8 is inserted exclusively into the extended bay 5. This renders the personal computer 9 accessible to the extension unit through the connector 34 and allows the function thereof to be extended.

In other words, a user selects any of the tuner unit 6, the DVD drive unit 7, and the battery unit 8 depending on the function he or she wants to use and inserts the selected one into the extended bay 5. There are cases where the extended bay 5 is indicated by various terms and is also termed a bay, an extended slot, a multi-bay, or a multi-purpose bay (multi-use bay).

<Hardware Configuration>

Figure 3:
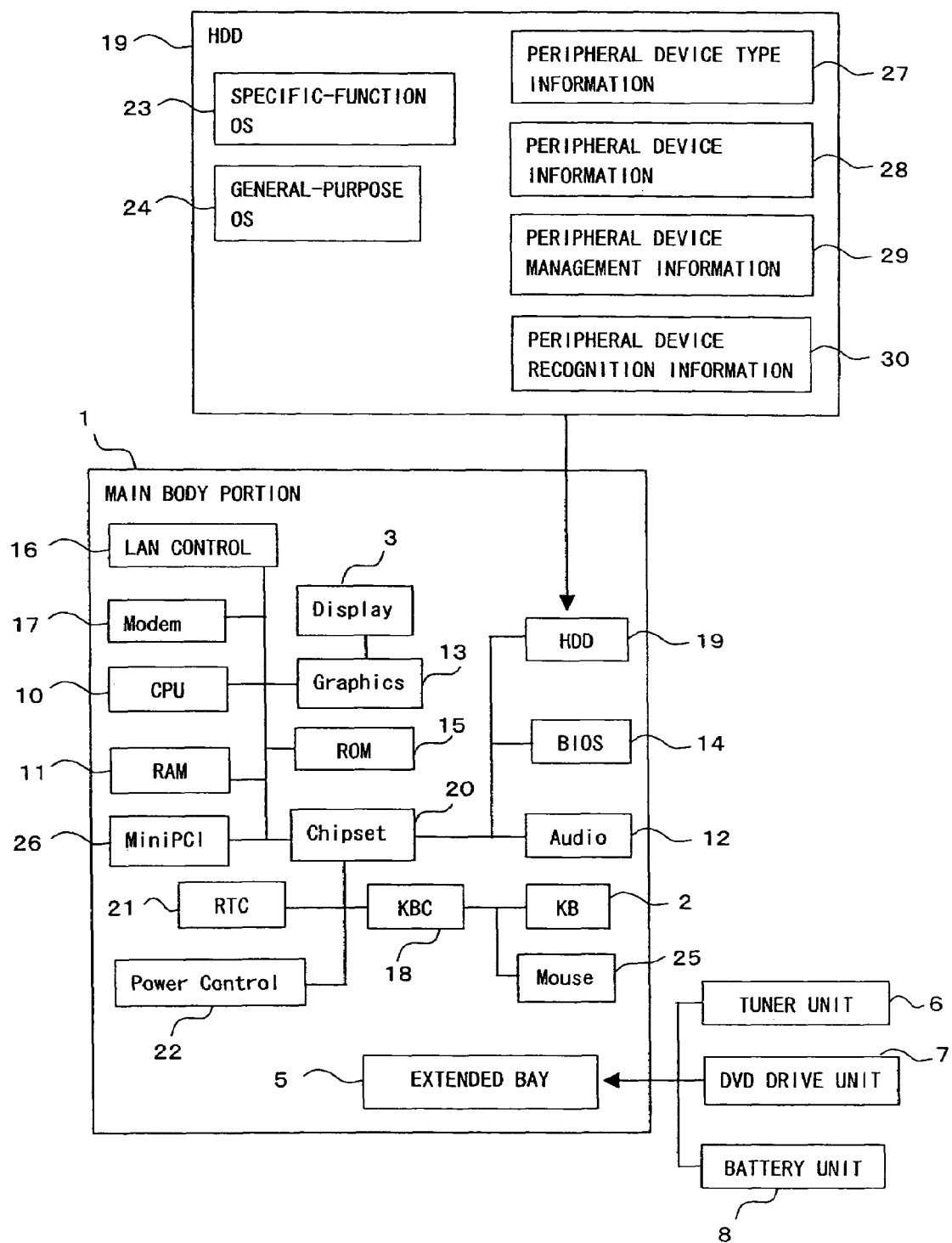
FIG. 3 is a hardware block diagram of an apparatus's main body 1.

FIG. 3 shows a hardware block diagram of the apparatus's main body 1. The apparatus's main body 1 has a CPU 10 which controls the information processing apparatus, a RAM 11 which stores therein a program executed in the CPU 10 or data processed by the CPU 10, an audio controller 12 for an audio (voice or sound) output, the display 3 which displays television broadcast information (an image, textual information, and the like) received by the tuner unit 6, information reproduced by the DVD drive unit 7, or information processed by the CPU 10, a video graphics controller 13, a rewritable ROM 15 which stores therein a BIOS 14, a LAN control card 16 for accessing a LAN, a modem card 17 for accessing an external network through a telephone line, a keyboard controller (KBC) 18 for controlling an input device such as the keyboard (KB) 2 composed of a plurality of keys and used to input codes such as characters or a mouse 25, a hard disk drive 19, a chipset 20, and a real time clock (RTC) 21. The CPU 10 is connected to the chipset 20.

To the chipset 20, there are connected the video graphics controller 13, the RAM 11, the ROM 15, the KBC 18, the RTC 21, a PowerControl 22, a MiniPCI 26, and the like. The chipset 20 controls the connection between the CPU 10 and each of the components. The RAM 11 temporarily stores therein a part of a program for an OS (Operating System) or an application program to be executed by the CPU 10. The RAM 11 also stores various data necessary for processing by the CPU 10.

In the hard disk drive (HDD) 19, there are stored OSes such as a specific-function OS 23 and a general-purpose OS 24, drivers, application programs, and various information such as peripheral device type information 27, peripheral device information 28, peripheral device management information 29, and peripheral device recognition information 30.

In the peripheral device type information 27, there are recorded information on the individual types of extension units that can be inserted into the extended bay 5 and identification information for the extension units. The identification information mentioned herein is information for identifying the type of the extension unit that has been inserted in the extended bay 5. In the peripheral device type information 27, there can additionally be recorded information on the type of a new extension unit which has not been recorded in the peripheral device type information 27 and identification information for the new extension unit.

In the peripheral device information 28, there is recorded information on the type of the extension unit currently inserted in the extended bay 5. When the extension unit currently inserted in the extended bay 5 is replaced with another extension unit, the type of the extension unit before the replacement is deleted from the peripheral device information 28 and the type of the extension unit after the replacement is recorded in the peripheral device information 28.

In the peripheral device management information 29, there is recorded information on the type of the extension unit currently usable on the personal computer. In the peripheral device recognition information 30, there is recorded, when the type of the extension unit recorded in the peripheral device management information 29 does not coincide with the type of the extension unit recorded in the peripheral device information 28, information on the incoincident type.

<Functional Outline>

In the information processing apparatus, the two OSes which are the typical general-purpose OS 24 and the specific-function OS 23 are preliminarily installed. The specific-function OS 23 has the function of receiving a television broadcast and allowing the received television broadcast to be viewed, listened to, and recorded. The specific-function OS 23 also has the function of allowing a DVD item to be viewed and listened to. In contrast to a typical information device, such as a personal computer, which has only one power button, a button (specific-function OS activation button 4) other than a normal power button is prepared in the information processing apparatus to activate the specific-function OS 23.

The BIOS (corresponding to each of receiving means, control means, and activating means) 14 embedded in the information processing apparatus distinguishes between an operation by the power button thereof and an operation by the specific-function OS activation button 4. The BIOS 14 activates the general-purpose OS 24 in response to an input to the power button, while activating the specific-function OS 23 in response to an input to the specific-function OS activation button 4. For this purpose, the general purpose OS 24 and the specific-function OS 23 are stored preliminarily in different sections (termed partitions).

The BIOS 14 has been adapted to activate the OS from each of the sections depending on either the input to the power button or the input to the specific-function OS activation button. By such a mechanism, the specific-function OS 23 can be activated with the input to the specific-function OS activation button 4.

Since this embodiment aims at short-time activation of the specific-function OS 23, information is stored in a hibernating (Hibernate) state. In other words, a memory image is recorded in the hard disk in the state in which a plurality of processes (tasks) composing a process in the specific-function OS 23 are being executed. Such a memory image will be hereinafter referred to as a Hibernate image. Therefore, during the activation of the general-purpose OS 24, the specific-function OS 23 other than the general-purpose OS 24 and an application and other information which are used in the process in the specific-function OS 23 should be prevented from being rewritten.

Accordingly, during the execution of the general-purpose OS 24, the information processing apparatus disables the recognition of the section (partition) in which the specific-function OS 23 has been recorded from the general-purpose OS 24. By the mechanism, even when the general-purpose OS 24 is activated, the recognition of the partition of the specific-function OS 23 from each of the general-purpose OS 24 and a program operated on the general-purpose OS 24 is disabled so that the information in the partition of the specific-function OS 23 is prevented from being rewritten. This enables the Hibernate image to be held and the short-time activation of the specific-function OS 23.

<Process Flow>

FIG. 4 is a flow chart showing a process (new storing process) when any of the extension units is first connected to the personal computer. The process can be implemented as a computer program executed in the CPU 10 contained in the information processing apparatus.

Figure 4B:
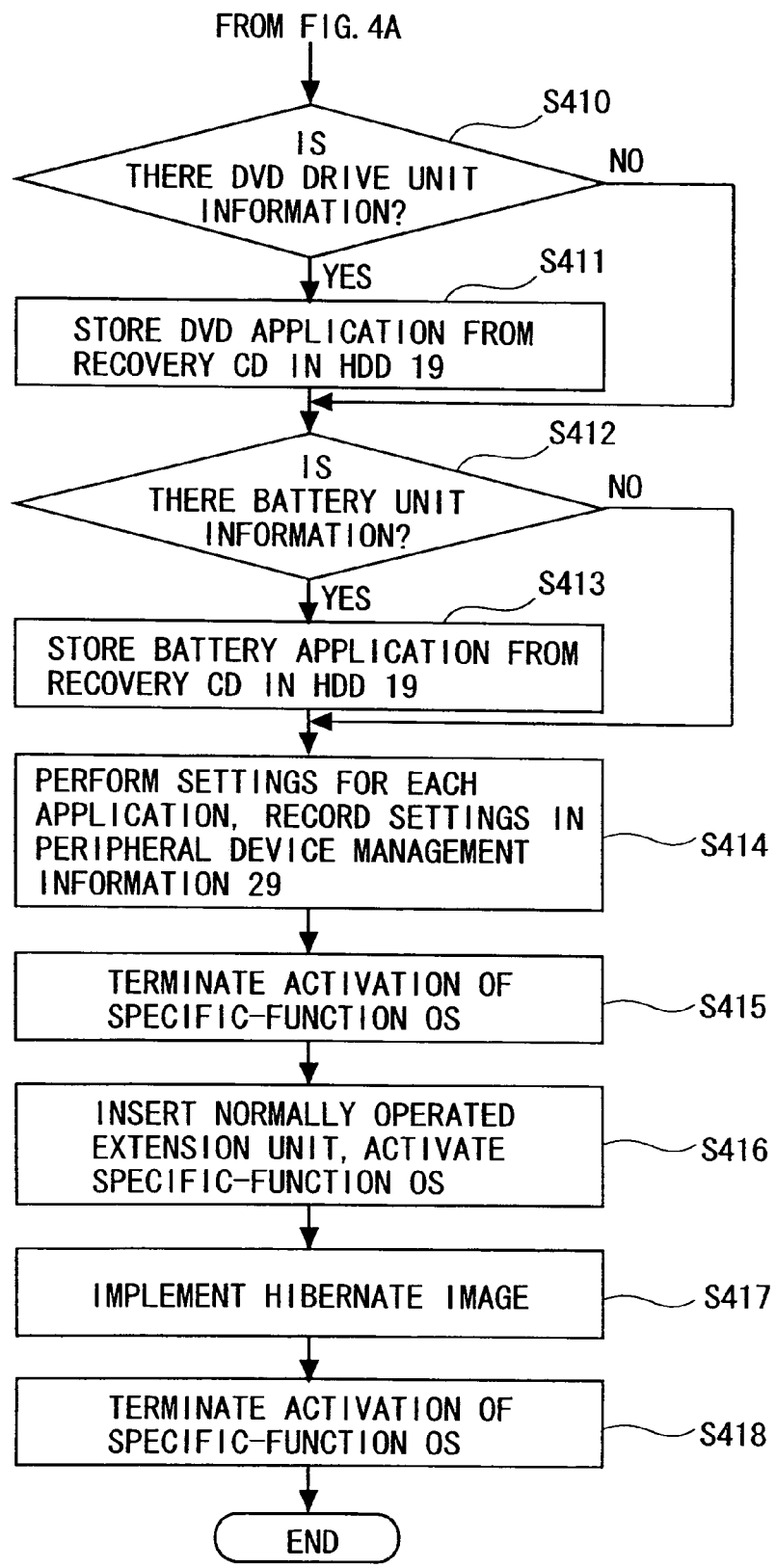
FIG. 4B is a flow chart showing a process (new storing process) when an extension unit is first connected to the information processing apparatus.

FIG. 4A-B show the process when the extension unit (which is also termed the peripheral device) was inserted in the extended bay of the personal computer after the specific-function OS 23 and a check application had been newly stored (also termed installed) in the HDD 19 of the personal computer. The specific-function OS 23 mentioned herein is a program which stores, in the HDD 19, a driver and an application each associated with the extension unit to be used by the user from a recovery CD storing therein drivers and applications associated with the various extension units. The specific-function OS 23 is also a program which deletes, from the HDD 19, a driver and an application each associated with the extension unit which is not used by the user. The specific-function OS 23 corresponds to the basic program according to The present invention.

The drivers and applications are programs which enable various extension units to be used on the computer. The driver and application associated with the extension unit used by the user correspond to the peripheral device associated program according to The present invention. The check application is a program for identifying the type of the extension unit inserted in the extended bay and corresponds to the identification program for identifying the type of the peripheral device connected to the computer according to The present invention. The CPU 10 which executes the specific-function OS 23, the driver and application associated with the extension unit, and the check application corresponds to the control means according to The present invention.

In the process, the information processing apparatus is activated when the extension unit to be used is inserted into the extended bay 5 of the personal computer and the specific-function OS activation button 4 of the personal computer is pressed down (S401).

Next, the information processing apparatus activates the check application (S402). Then, the information processing apparatus judges whether or not the check application was activated for the first time (S403). When the number of times the check application was activated is not recorded in the HDD 19, the information processing apparatus judges that the check application was activated for the first time and records the number of times the check application was activated in the HDD 19. Here, the information processing apparatus records 1 as the number of times the check application was activated.

When it was judged that the activation of the check application was the first-time one, the information processing apparatus performs the process in S404. When it was judged that the activation of the check application was not the first-time one, the information processing apparatus adds a value corresponding to one unit to the value recorded as the number of times the check application was activated and performs the process in S503 of FIG. 5A (see (A) in each of FIGS. 4A and 5A). Thus, the process to be performed by the information processing apparatus differs depending on whether the number of times the check application was activated is one or two or more. This is why the information processing apparatus judges whether or not the activation of the check application is the first-time one.

Next, the information processing apparatus records the type of the extension unit currently inserted in the extended bay 5 in the peripheral device information 28 (S404). In the process, the check application references the peripheral device type information 27 first.

Then, the check application identifies the type of the extension unit currently inserted in the extended bay 5 and records the identified type of the extension unit in the peripheral device information 28. In the extension unit, the identification information associated with the identification information for the extension unit that has been recorded in the peripheral device type information 27 has been recorded. Accordingly, the check application identifies the type of the extension unit inserted in the extended bay 5 based on the identification information for the extension unit that has been recorded in the peripheral device type information 27 and on the identification information of the extension unit inserted in the extended bay 5.

Although an example which identifies the type of the extension unit inserted in the extended bay 5 based on the identification information has been shown herein, the type of the extension unit inserted in the extended bay 5 may also be identified by using another means.

Figure 9:
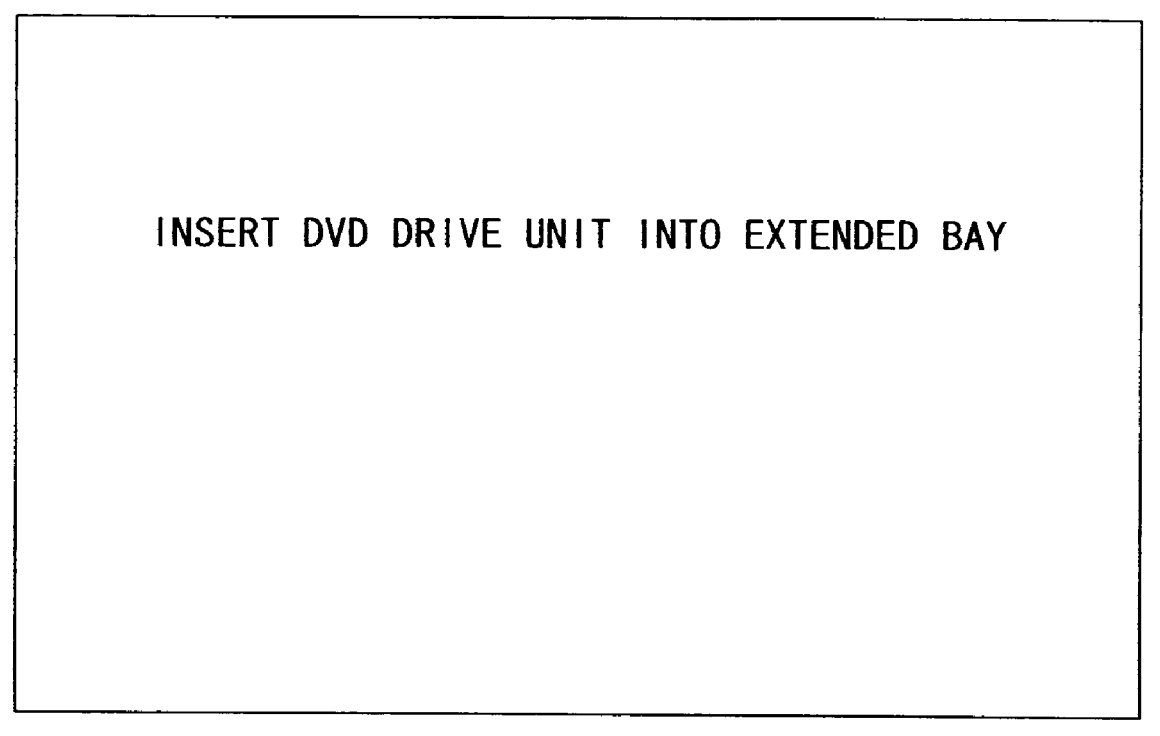

Next, the information processing apparatus terminates the activation of the specific-function OS 23 under the control of the check application (S405). Then, the information processing apparatus displays an instruction to insert the DVD drive unit 7 into the extended bay 5 on the screen of the liquid crystal display 3. FIG. 9 shows a screen example of the instruction to insert the DVD drive unit 7 into the extended bay 5. Then, after the DVD drive unit 7 was inserted in the extended bay 5 and the recovery CD was inserted in the DVD drive, the specific-function OS 23 is activated upon the pressing down of the specific-function OS button of the personal computer (S406). In the recovery CD, the drivers and applications associated with the various extension units have been stored.

Next, the information processing apparatus acquires information (hereinafter referred to as connection information) on the type of the extension unit currently inserted in the extended bay 5 from the peripheral device information 28 (S407). Then, the information processing apparatus judges whether or not information indicative of the insertion of the tuner unit 6 in the extended bay 5 is present in the connection information acquired in the process of S407 (S408). If the information is present, the information processing apparatus stores, in the HDD 19, the driver and application (hereinafter referred to as a tuner application) each associated with the tuner unit 6 from the recovery CD (S409). If the information is not present, the information processing apparatus performs the process in S410.

Next, the information processing apparatus judges whether or not information indicative of the insertion of the DVD drive unit 7 in the extended bay 5 is present in the connection information acquired in the process of S407 (S410) If the information is present, the information processing apparatus automatically stores, in the HDD 19, the driver and application (hereinafter referred to as a DVD application) each associated with the DVD drive unit 7 from the recovery CD (S411). If the information is not present, the information processing apparatus performs the process in S412.

Next, the information processing apparatus judges whether or not information indicative of the insertion of the battery unit 8 to the extended bay 5 is present in the connection information acquired in the process of S407 (S412). If the information is present, the information processing apparatus automatically stores, in the HDD 19, the driver and application (hereinafter referred to as a battery application) each associated with the battery unit 8 from the recovery CD (S413). If the information is not present, the information processing apparatus performs the process in S414.

Next, the information processing apparatus performs settings for an application associated with that one of the various extension units that has been stored in the HDD 19 in the process of S408 through S413 under the control of the check application. The settings for the application indicate making the extension unit inserted in the extended bay 5 usable on the personal computer.

Then, the information processing apparatus records the connection information acquired in the process of S407 in the peripheral device management information 29 (S414). Subsequently, the information processing apparatus terminates the activation of the specific-function OS 23 under the control of the check application (S415).

Next, the information processing apparatus displays an instruction to insert the normally used extension unit into the extended bay 5 on the screen of the display 3. The normally used extension unit mentioned herein indicates an extension unit which is operable with the driver and application stored in the HDD 19 in the process of S408 through S414.

Then, after the normally used extension unit was inserted in the extended bay 5, the information processing apparatus activates the specific-function OS 23 upon the pressing down of the specific-function OS activation button 4 of the personal computer (S416).

Next, the information processing apparatus implements a Hibernate image for the peripheral device management information 29 under the control of the check application. In other words, the information recorded in the peripheral device management information 29 is brought into an unchangeable state (S417).

Figure 6:
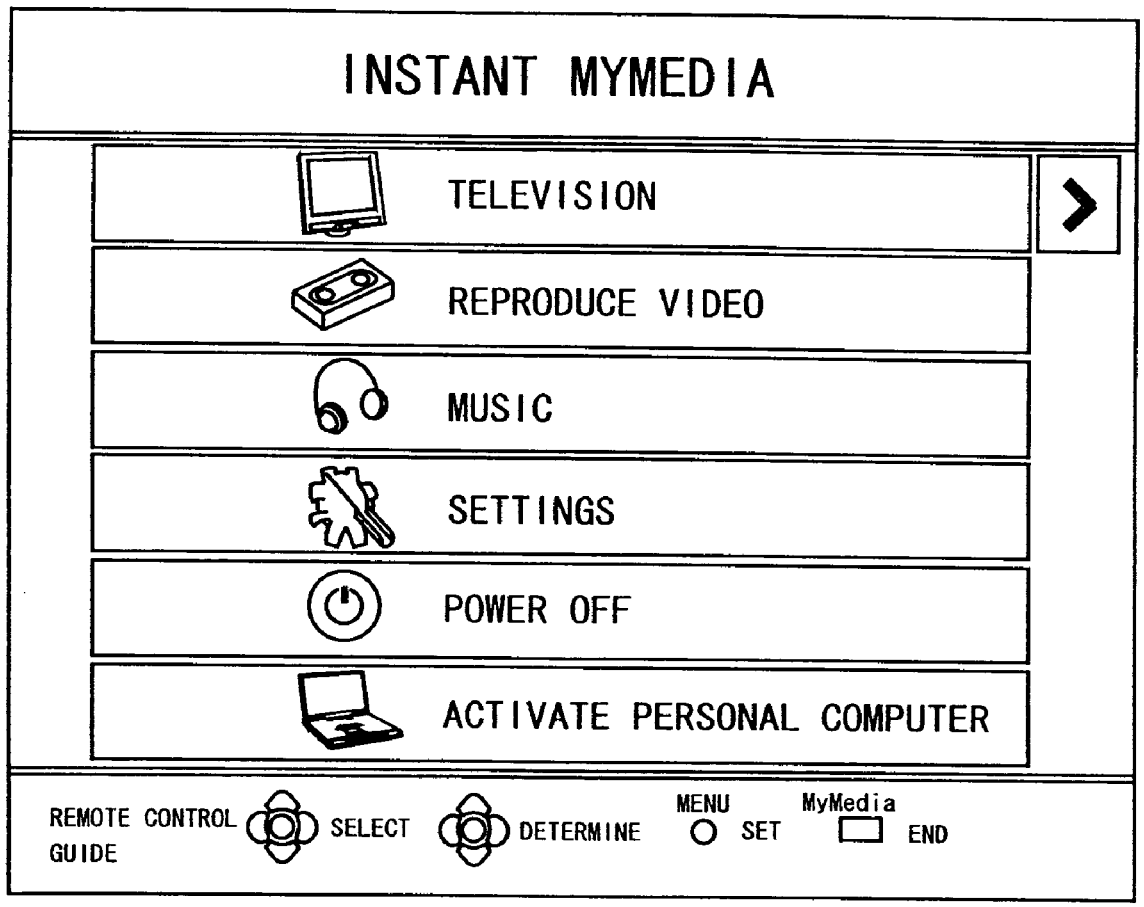
FIG. 6 is an example of screen display after a tuner unit 6 was inserted in an extended bay 5.
Figure 7:
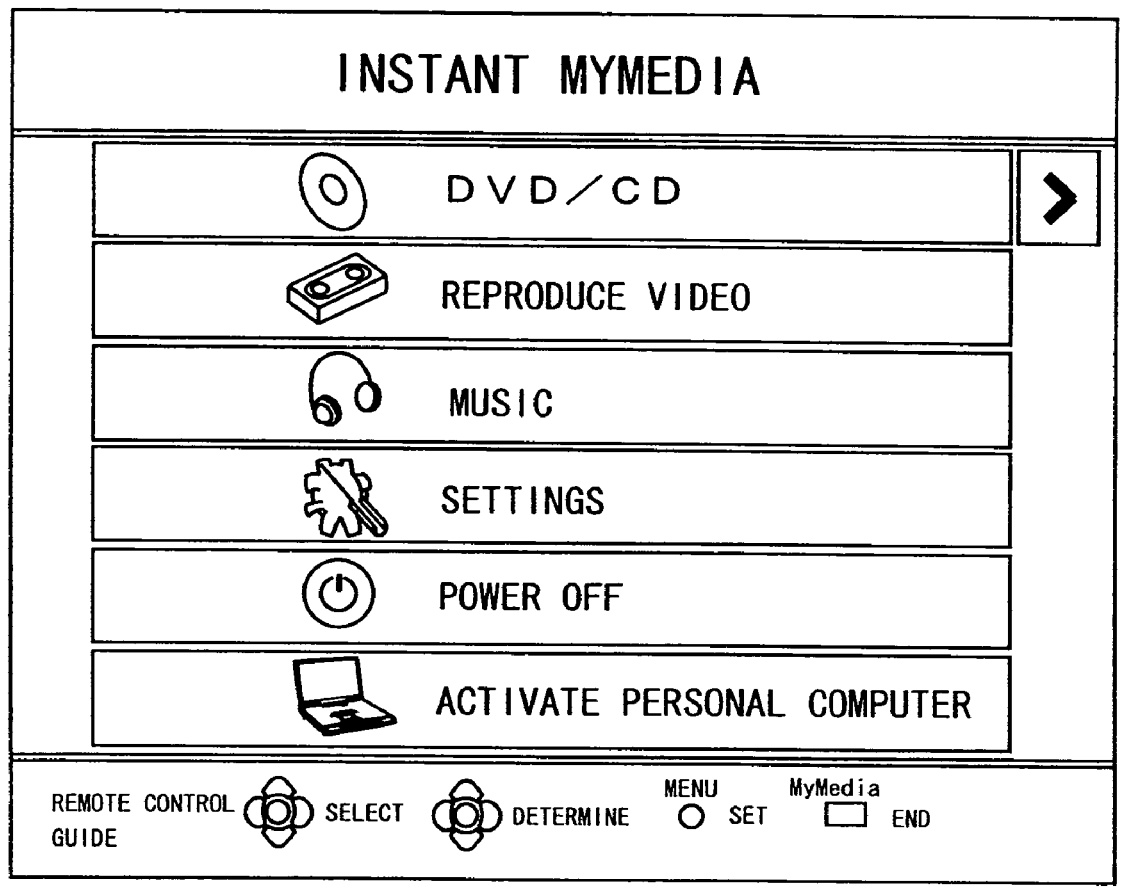
FIG. 7 is an example of screen display after a DVD drive unit 7 was inserted in the extended bay 5.
Figure 8:
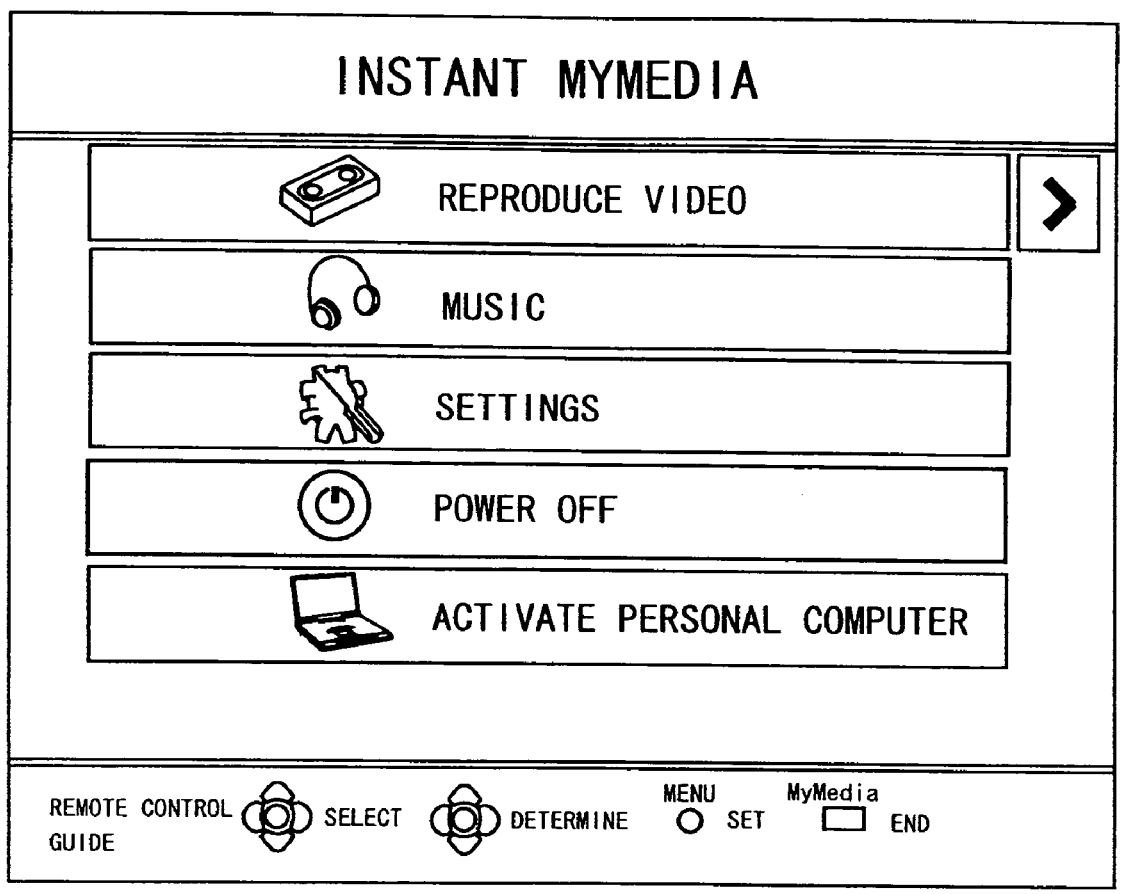
FIG. 8 is an example of screen display after a battery unit 8 was inserted in the extended bay 5.

Next, the information processing apparatus terminates the activation of the specific-function OS 23 under the control of the check application (S418). Then, after the activation of the information processing apparatus was terminated, the normally used extension unit becomes usable on the personal computer upon the activation of the specific-function OS 23. FIGS. 6 through 8 show screen examples displayed on the display 3 when the activation was performed with the specific-function OS 23 after the new storing process had been terminated.

Thus, the information processing apparatus is allowed to store only the driver and application which are necessary for the peripheral device currently connected to the personal computer in the storage device.

FIGS. 5A-B are a flow chart showing a process (unit replacing process) when the normally used extension unit was replaced. The process can be implemented as a computer program to be executed in the CPU 10 contained in the information processing apparatus. In the process, the information processing apparatus is activated when the normally used extension unit inserted in the extended bay 5 was replaced with another extension unit and the specific-function OS activation button 4 of the personal computer was pressed down (S501). Then, the information processing apparatus activates the check application (S502).

Next, the information processing apparatus references each of the peripheral device information 28 and the peripheral device management information 29 under the control of the check application (S503). Then, the information processing apparatus judges whether the information recorded in the peripheral device information 28 is different from the information recorded in the peripheral device management information 29 under the control of the check application (S504). When the information is different, the information processing apparatus performs the process in S505. When the information is not different, the information processing apparatus terminates the unit replacing process.

Next, the information processing apparatus acquires the connection information from the peripheral device information 28 under the control of the check application. Then, the information processing apparatus records, under the control of the check application, the information on the type of the extension unit recorded in the peripheral device information 28 which does not coincide with the type of the extension unit recorded in the peripheral device management information 29 in the peripheral device recognition information 30 in the HDD 19 (S505).

Next, the information processing apparatus displays that the extension unit has been replaced on the screen of the display 3. Then, the information processing apparatus displays an instruction to insert the DVD drive unit 7 into the extended bay 5 on the screen of the display 3. Further, the information processing apparatus displays the preparation of the recovery CD on the screen of the display 3 (S506).

Next, the information processing apparatus judges whether or not the user has approved replacing the normally used extension unit (S507). When the user has not approved, the information processing apparatus terminates the unit replacing process. When the user has approved, the information processing apparatus cancels the Hibernate image under the control of the check application. In other words, the information recorded in the peripheral device management information 29 is brought into a changeable state (S508).

Next, the information processing apparatus acquires the information on the type of the extension unit recorded in the peripheral device recognition information 30 under the control of the check application. Then, the information processing apparatus deletes the application for the extension unit that has become unnecessary from the HDD 19 based on the information on the type of the extension unit recorded in the peripheral device recognition information 30 (S509). The application for the extension unit that has become unnecessary indicates an application for the normally used extension unit after the replacement of the normally used extension unit with the other extension unit.

Next, the information processing apparatus terminates the activation of the specific-function OS 23 under the control of the check application (S510). Then, the information processing apparatus reads therein the information recorded in the peripheral device information 28 therefrom (S511).

Then, after the DVD drive unit 7 was inserted in the extended bay 5 and the recovery CD was inserted in the DVD drive, the information processing apparatus activates the specific-function OS 23 upon the pressing down of the specific-function OS activation button of the personal computer (S512).

Next, the information processing apparatus judges whether or not information indicative of the insertion of the tuner unit 6 in the extended bay 5 is present in the connection information acquired in the process of S505 (S513). If the information is present, the information processing apparatus automatically stores, in the HDD 19, the tuner application from the recovery CD (S514). If the information is not present, the information processing apparatus performs the process in S515.

Next, the information processing apparatus judges whether or not information indicative of the insertion of the DVD drive unit 7 in the extended bay 5 is present in the connection information acquired in the process of S505 (S515). If the information is present, the information processing apparatus automatically stores, in the HDD 19, the DVD application from the recovery CD (S516). If the information is not present, the information processing apparatus performs the process in S516.

Next, the information processing apparatus judges whether or not information indicative of the connection of the battery unit 8 to the extended bay 5 is present in the connection information acquired in the process of S505 (S517). If the information is present, the information processing apparatus automatically stores, in the HDD 19, the battery application from the recovery CD (S518). If the information is not present, the information processing apparatus performs the process in S519.

Next, the information processing apparatus performs settings for an application for that one of the various extension units that has been stored in the HDD 19 in the process of S513 through S518. Then, the information processing apparatus records the connection information acquired in the process of S505 in the peripheral device management information 29 (S519). Subsequently, the information processing apparatus terminates the activation of the specific-function OS 23 under the control of the check application (S520).

Next, the information processing apparatus displays an instruction to insert the normally used extension unit into the extended bay 5 on the screen of the display 3. The normally used extension unit mentioned herein indicates the extension unit which is operable with the driver and application stored in the HDD 19 in the process of S513 through S518. After the normally used extension unit was inserted in the extended bay 5, the information processing apparatus activates the specific-function OS 23 upon the pressing down of the specific-function OS activation button 4 of the personal computer (S521).

Next, the information processing apparatus implements a Hibernate image for the peripheral device management information 29. In other words, the information recorded in the peripheral device management information 29 is brought into an unchangeable state (S522). Then, the information processing apparatus terminates the activation of the specific-function OS 23 under the control of the check application (S523).

Then, after the activation of the information processing apparatus was terminated, the normally used extension unit becomes usable on the personal computer upon the activation of the specific-function OS 23. FIGS. 6 through 8 show a screen example displayed on the display 3 when the activation was performed with the specific-function OS 23 after the unit replacing process had been terminated.

Thus, the information processing apparatus is allowed to delete the unnecessary driver and application for the peripheral device which is not currently connected to the personal computer. In addition, the information processing apparatus is also allowed to store, in the storage device, only the driver and application which are necessary for the peripheral device currently connected to the personal computer.

As described above, the information processing apparatus stores, in the HDD 19, only the driver and application which are necessary for the extension unit currently inserted in the extended bay 5. Accordingly, the area in use of the HDD 19 can be reduced. In addition, the information processing apparatus records the extension unit currently inserted in the extended bay 5 as a Hibernate image. This allows the application to be activated based on the information recorded as the Hibernate image and operate in a constantly optimum software environment.

Moreover, the information processing apparatus makes, upon the activation of the specific-function OS 23, a comparison with a pre-activation state and automatically deletes the application that has become unnecessary. As a result, the unnecessary application is deleted from the HDD 19 and, even when an application is newly stored therein, the capacity of the HDD 19 can be prevented from being overrun.

<Variation>

The embodiment described above has shown an example of the information processing apparatus which terminates the activation of the specific-function OS 23 under the control of the check application. However, the embodiment of The present invention is not limited to such constitution. For example, it is also possible to perform the new storing process shown in FIGS. 4A-B and the unit replacing process shown in FIGS. 5A-B without terminating the activation of the specific-function OS 23.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

<Others>

The disclosures of Japanese patent application No. JP2005-102450 filed on Mar. 31, 2005 including the specification, drawings and abstract are incorporated herein by reference.

What is claimed is:

1. An information processing apparatus connectable to extension units including a plurality of types of peripheral devices insertable into an extension slot, comprising:
a first storing unit to store therein a specific function program for the plurality of types of peripheral devices, a plurality of types of peripheral device associated programs corresponding to the plurality of types of the peripheral devices which are executed when the peripheral devices are in use, and an identification program identifying a type of the peripheral device connected to the information processing apparatus;
a specific function program activator configured to activate the specific function program, and
a control unit to execute the specific function program, the peripheral device associated programs, and the identification program,
wherein one type of a peripheral device includes a drive unit to read information from a second storing unit that stores other plurality of types of peripheral device associated programs corresponding to other plurality of types of the peripheral devices, and wherein the control unit:
compares a type of a currently connected peripheral device with a type of a currently usable peripheral device stored in the first storing unit, when the currently usable peripheral device is replaced with the currently connected peripheral device,
requests insertion of the drive unit into the extension slot and stores in the first storing unit, when the type of the currently connected peripheral device does not coincide with the type of the currently usable peripheral device stored in the first storing unit, from the second storing unit inserted in the drive unit, a peripheral device associated program associated with the currently connected peripheral device, and
configures activating the peripheral device associated program associated with the currently connected peripheral device, in response to the specific function program activator.

2. An information processing apparatus according to claim 1, where the control unit deletes, from the first storing unit, any of the peripheral device associated programs that are not associated with the currently connected peripheral.

3. A computer readable storage medium storing a program for causing a computer connectable to extension units including a plurality of types of peripheral devices insertable into an extension slot, and having a first storing unit that stores a specific function program for the plurality of types of peripheral devices, a plurality of types of peripheral device associated programs corresponding to the plurality of types of the peripheral devices which are executed when the peripheral devices are in use, and an identification program identifying a type of the peripheral device connected to the computer, and having a drive unit as one type of a peripheral device and configured to read information from a second storing unit that stores other plurality of types of peripheral device associated programs corresponding to other plurality of types of the peripheral devices, to execute:
configuring a specific function program activator to activate the specific function program;
comparing a type of a currently connected peripheral device with a type of a currently usable peripheral device stored in the first storing unit, when the currently usable peripheral device is replaced with the currently connected peripheral device;
storing in the first storing unit, when the type of the currently connected peripheral device does not coincide with the type of the currently usable peripheral device stored in the first storing unit, from the second storing unit inserted in the drive unit, a peripheral device associated program associated with the currently connected peripheral device; and
activating the peripheral device associated program associated with the currently connected peripheral device, in response to the specific function program activator.

4. A computer readable storage medium storing the program according to claim 3, wherein the program causes the computer to further delete, from the first storing unit, any of the peripheral device associated programs that is not associated with the currently connected peripheral device.

5. An information processing method using a computer connectable to extension units including a plurality of types of peripheral devices insertable into an extension slot, comprising:
storing in a first storing unit a specific function program for the plurality of types of peripheral devices, a plurality of types of peripheral device associated programs corresponding to the plurality of types of the peripheral devices which are executed when the peripheral devices are in use, and an identification program for identifying a type of the peripheral device connected to the computer;

providing a drive unit as one type of a peripheral device and configured to read information from a second storing unit that stores other plurality of types of peripheral device associated programs corresponding to other plurality of types of the peripheral devices;

configuring an activator for activating the specific function program; and using a computer processor:

comparing a type of a currently connected peripheral device with a type of a currently usable peripheral device stored in the first storing unit, when the currently usable peripheral device is replaced with the currently connected peripheral device, requesting insertion of the drive unit into the extension slot and storing in the first storing unit, when the type of the currently connected peripheral device does not coincide with the type of the currently usable peripheral device stored in the first storing unit, from the second storing unit inserted in the drive unit, a peripheral device associated program which is associated with the currently connected peripheral device, and configuring activating the peripheral device associated program associated with the currently connected peripheral device, in response to the activator.

6. An information processing method according to claim 5, further deleting, from the first storing unit, any of the peripheral device associated programs that are not associated with the currently connected peripheral device.

\* \* \* \* \*